United States Patent [19]
Leong

[11] Patent Number: 6,006,249
[45] Date of Patent: Dec. 21, 1999

[54] METHOD AND APPARATUS FOR CONCURRENT DATA PROCESSING

[75] Inventor: Sang F. Leong, New York, N.Y.

[73] Assignee: The Chase Manhattan Bank, New York, N.Y.

[21] Appl. No.: 08/917,041

[22] Filed: Aug. 19, 1997

[51] Int. Cl.⁶ ................................................... G06F 9/00
[52] U.S. Cl. .................................. 709/107; 709/103
[58] Field of Search .................................... 709/100, 102, 709/103, 106, 107, 300, 301, 303, 205

[56] References Cited

U.S. PATENT DOCUMENTS

| | | | |
|---|---|---|---|
| 5,592,671 | 1/1997 | Hirayama . | |
| 5,603,031 | 2/1997 | White et al. | 709/303 |
| 5,740,231 | 4/1998 | Cohn et al. | 379/88.2 |
| 5,842,195 | 11/1998 | Peters et al. | 707/1 |
| 5,893,098 | 4/1999 | Peters et al. | 707/10 |
| 5,909,576 | 6/1999 | Fulk | 709/301 |
| 5,915,112 | 6/1999 | Boutcher | 395/712 |
| 5,941,945 | 8/1999 | Aditham et al. | 709/205 |

FOREIGN PATENT DOCUMENTS 475080  3/1992  European Pat. Off. .

OTHER PUBLICATIONS

H. Peter Hofstee et al, A Distributed Implementation of a Task Pool, Computer Science, California Institute of Technology, 1991, pp. 338–348.

*Primary Examiner*—Majid A. Banankhah
*Attorney, Agent, or Firm*—Ostrolenk, Faber, Gerb & Soffen, LLP

[57] ABSTRACT

A system including a plurality of micro-processing units each operating under its own control program and being capable of performing at least one of a plurality of tasks for manipulating electronic data, and an electronic bulletin board for posting the one or more tasks required to manipulate the electronic data, the posted tasks being readable by the micro-processing units, where at least one of the micro-processing units (capable of performing at least one of the posted tasks) executes that task on the electronic data in response to reading the electronic bulletin board and determining that the posted task should be executed.

49 Claims, 10 Drawing Sheets

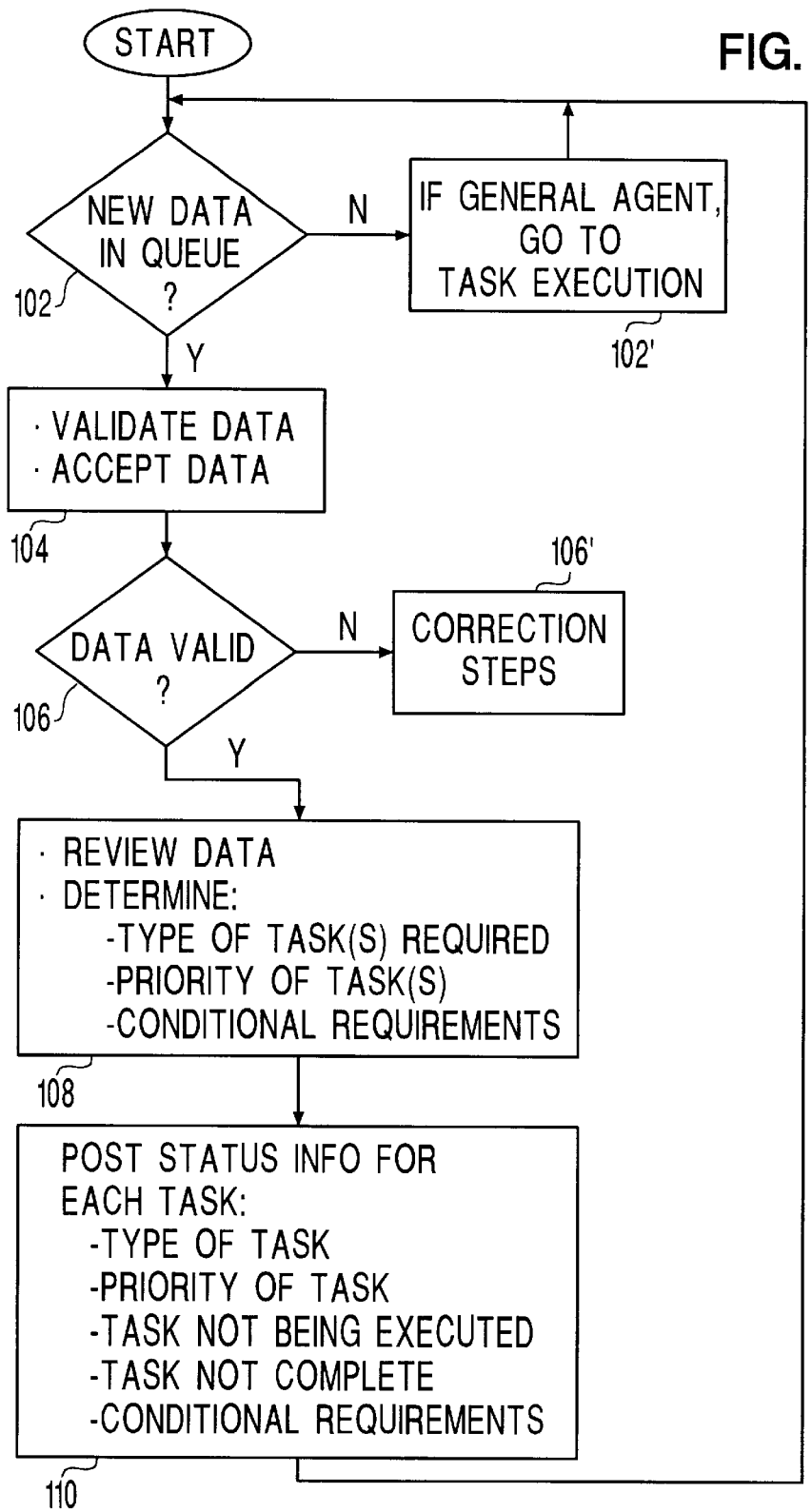

METHOD AND APPARATUS FOR CONCURRENT DATA PROCESSING

BACKGROUND OF THE INVENTION

1. Field of the Invention

The present invention relates to multi-tasking micro-processing systems and, more particularly, to multi-tasking systems employing networked stand alone and independently operating micro-processing units each of which perform one or more tasks for manipulating electronic data.

2. Related Art

The processing of large amounts of electronic data is becoming more and more common among business concerns. Efficient manipulation of the electronic data is critical because, even with ultra fast computers, the magnitude of electronic data to be manipulated places limits on throughput.

With reference to FIG. 1, a prior art multi-tasking computing system 1' employs a central managing unit 10' which receives or monitors incoming electronic data. The system 1' also includes a plurality of processing units 12' coupled to the central managing unit 10'. A memory 14' may also be employed to store data as needed.

The multi-tasking system 1' of FIG. 1 is sometimes called a Massively Parallel Processor (MPP) system and is used, for example, in the IBM SP2, NCR, and Cray systems. An MPP system 1' controls the processing units 12' at the basic operating system level. Thus, the central managing unit 10' controls which processing unit 12' performs which jobs in manipulating the electronic data. In this way, the throughput of the entire system is improved because each processing unit 12' performs only a part of the overall work required.

Unfortunately, the multi-tasking system 1' of the prior art has several disadvantages. For example, the central manager unit 10' imposes overhead burdens on the system in terms of time, cost and complexity while performing no value added work on the electronic data. Further, the processing units 12' of an MPP system 1' typically perform relatively small units of work as compared to the total work required.

Another disadvantage of the prior art system is that the hardware must be custom designed and usually requires special network switching technology. Consequently, scalability of the system may become problematic because the central managing unit 10' may require custom hardware and/or software configuration changes when other processing units 12' are added to the system 1'.

Accordingly, there is a need in the art for a multi-tasking computing system which utilizes a standard network over which a plurality of processing units communicate, which system is readily scalable.

SUMMARY OF THE INVENTION

In order to overcome the disadvantages of the prior art, the system of the present invention includes a plurality of micro-processing units each operating under its own control program and being capable of performing at least one of a plurality of tasks for manipulating electronic data, and an electronic bulletin board for posting the one or more tasks required to manipulate the electronic data, the posted tasks being readable by the micro-processing units, where at least one of the micro-processing units (capable of performing at least one of the posted tasks) executes that task on the electronic data in response to reading the electronic bulletin board and determining that the posted task should be executed.

Other features and advantages of the present invention will become apparent from the following description of the invention which refers to the accompanying drawings.

BRIEF DESCRIPTION OF THE DRAWINGS

For the purpose of illustrating the invention, there are shown in the drawings forms which are presently preferred, it being understood, however, that the invention is not limited to the precise arrangements and instrumentalities shown.

FIG. 6 is a flow diagram showing the control steps of the data validation and posting steps of FIG. 5;

DETAILED DESCRIPTION OF THE INVENTION

Figure 1:
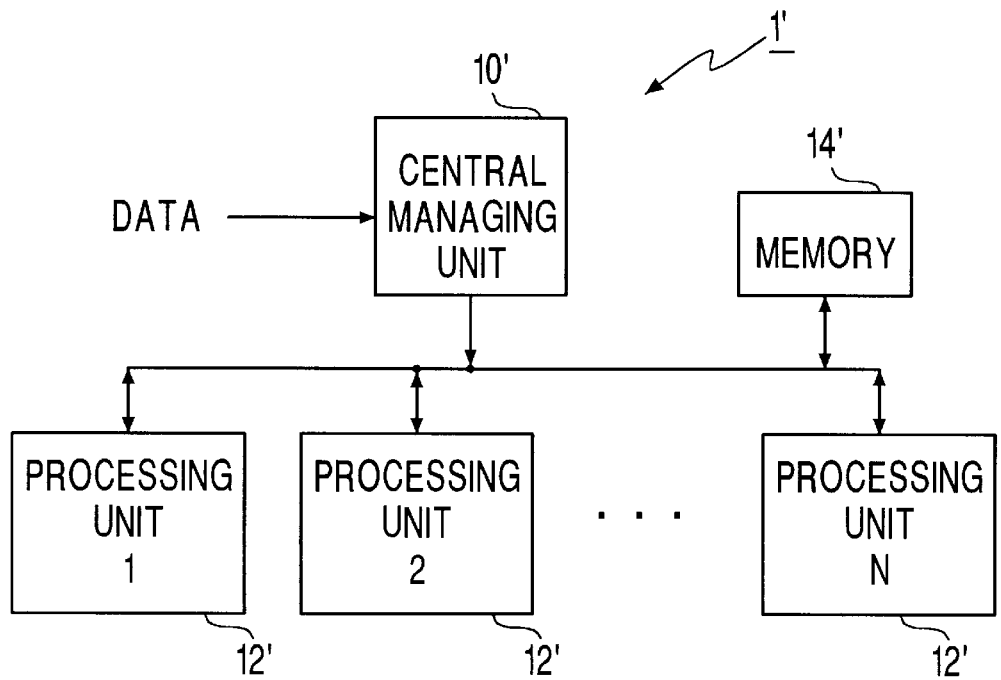
FIG. 1 is a block diagram of a multi-tasking computing system according to the prior art.
Figure 2:
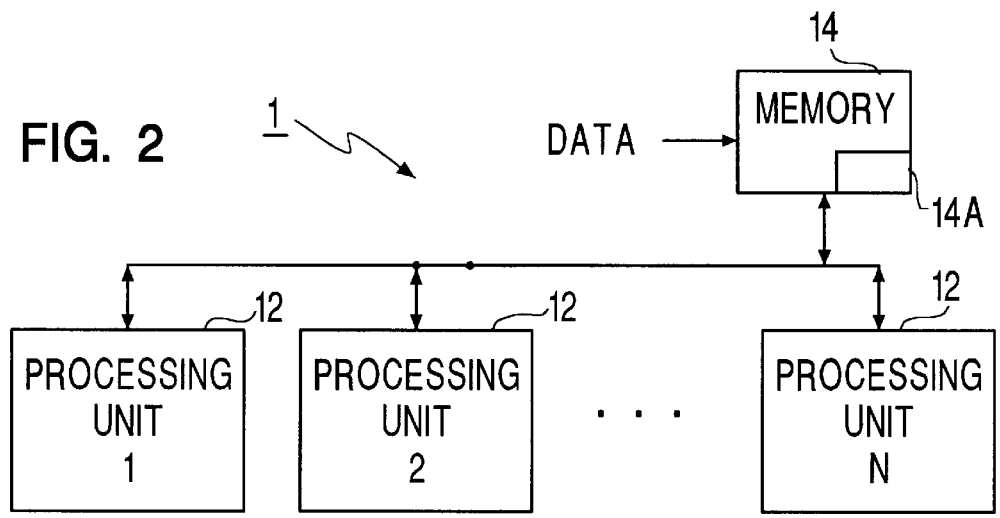
FIG. 2 is a block diagram of a multi-tasking computing system according to the preferred embodiment of the present invention.

Referring now to the drawings wherein like numerals indicate like elements, there is shown in FIG. 2 a block diagram of a multi-tasking computing system 1 according to the preferred embodiment of the present invention. Unlike the prior art, the multi-tasking system 1 of the present invention includes processing units 12 each of which is self controlled using a software application running on its own operating system. Thus, there is no central management and/or control unit.

Figure 3:
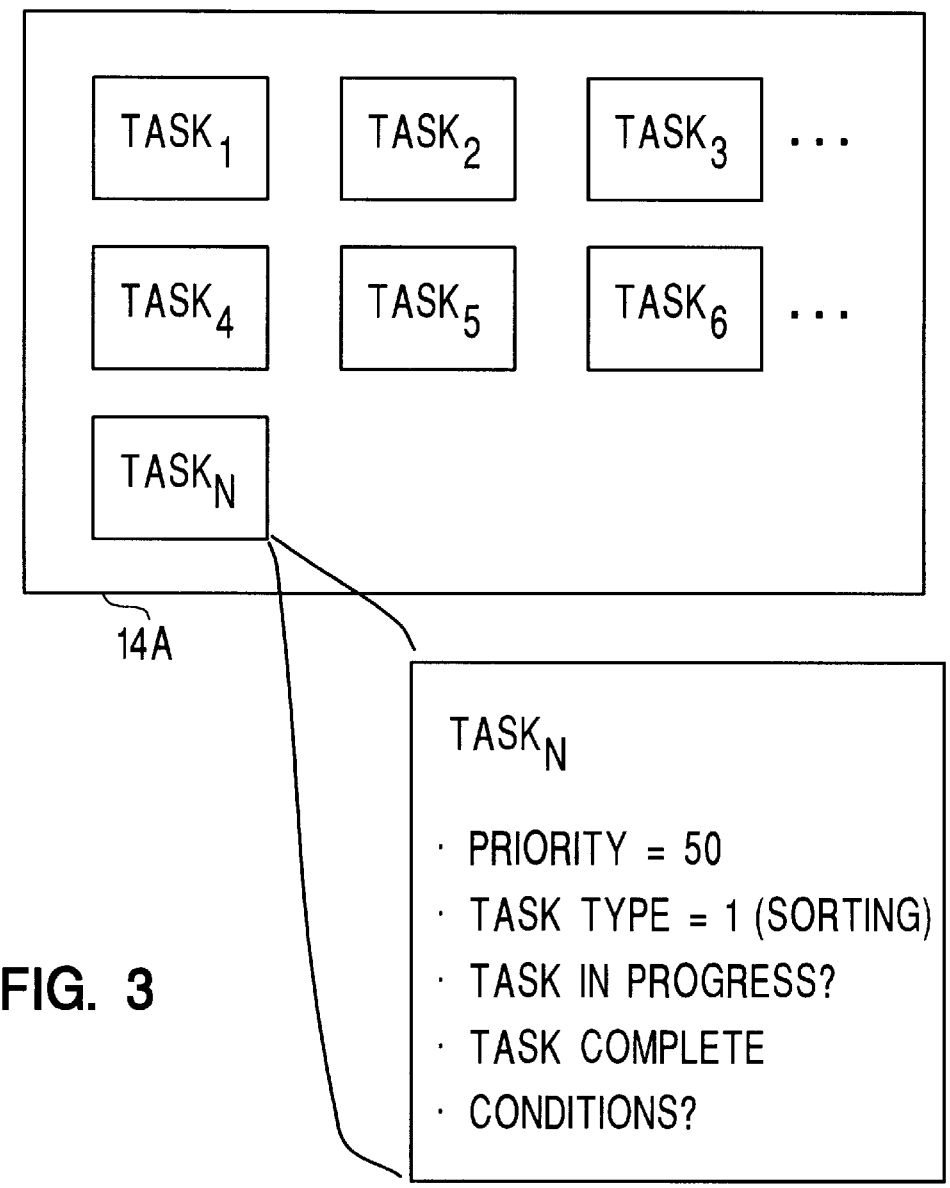
FIG. 3 is a conceptional block diagram showing a bulletin board of the multi-tasking computing system of FIG. 2.

Referring to FIGS. 2 and 3, the system 1 manipulates electronic data according to one or more tasks (or units of work). The electronic data may be in any format, for example, image data, text data, or the like and may arrive in one or more blocks or batches.

The specific tasks to be performed on the electronic data (or batches of data) are not of criticality to the invention, so long as the overall work to be performed on the electronic data may be partitioned into the tasks. For instance, a system may; (i) accept image data; (ii) sort the data; and (iii) distribute that data according to a set of tasks. Thus, the tasks required to manipulate the electronic data may be partitioned into "accepting tasks," "sorting tasks," and "distributing tasks." It is apparent to those skilled in the art that the tasks may be further broken down into smaller tasks if desired so long as the tasks achieve the required result.

The micro-processing units 12 are also referred to herein as "agents" because the operation of the micro-processing units 12 closely parallel the actions of human agents in a processing system. As will be discussed in detail below, each of the micro-processing units 12 is predisposed to be an "agent" in performing a particular task on the electronic data (just as a human agent may be assigned to perform a particular job in an assembly line).

Referring to FIG. 3, a conceptual description of task processing distribution and control among the micro-processing units 12 of the present invention is now presented. The tasks, generally designated TASK1 through TASKn, are posted on an electronic bulletin board 14*a* which may reside in the memory 14. The micro-processing units 12 are capable of reading the contents (i.e., the tasks) of the bulletin board 14*a* and determining whether they are capable of performing one or more of the tasks (i.e., whether they are agents for performing the task(s)). In response to reading that a certain task is posted on the bulletin board 14*a* and that it is capable of performing that task, one of the micro-processing units 12 executes the posted task.

Referring to, for example, TASKn of FIG. 3, the information (or status information) posted on the bulletin board 14*a* for each task may include (i) the type of task to be executed; (ii) the priority of the task; (iii) that the task is being executed by one of the micro-processing units; (iv) that the task is complete; and/or (v) one or more conditions must be met before the task should be executed.

Since the status information of each task preferably provides an indication of the type of task to be performed, the micro-processing units 12 may determine whether they are agents of particular posted tasks when they read the bulletin board 14*a*.

Further, since the status information of the posted tasks preferably includes the priority of the tasks, when the micro-processing units 12 read the bulletin board 14*a* they may determine which tasks should be executed first. It is preferred that tasks having higher priority be executed before tasks having a lower priority. It is also preferred that when two tasks have the same priority level, the tasks be executed in a first in first out (FIFO) sequence. Accordingly, the status information may also include an indication of when the task was first posted on the bulletin board 14*a*.

It is noted that the priority of a task is a dynamic quantity and may change based on time of day, excessive delays in the processing system, and/or external human directive.

In order to prevent two micro-processing units 12 from executing a particular posted task on the electronic data simultaneously, the microprocessing units 12 are capable of altering the status information on the bulletin board 14*a*. In particular, when a micro-processing unit 12 determines that it should execute a particular task, it alters the status information to indicate that that particular task is being processed. Accordingly, when the micro-processing units 12 read the bulletin board 14*a*, they will not execute that task because it is already being executed by another agent.

In order to prevent a micro-processing unit 12 from executing a posted task which has already been executed, when a micro-processing unit 12 has completed a particular task it alters the status information to indicate that that particular task is complete. Accordingly, when the micro-processing units 12 read the bulletin board 14*a*, they will not execute the completed task.

The status information posted for a particular task may indicate that one or more conditions must be met before the task should be executed. For example, TASK1 might be required to be complete before TASK5 should be performed and, therefore, the status information posted for TASK5 would so indicate. Other variations on such sequencing of tasks are possible. For example, part of TASK1 may be defined to include posting a next task (i.e., TASK5) on the bulletin board 14*a* when TASK1 is complete.

Referring to FIG. 2 the electronic data preferably enters the memory 14 which acts as a queue for storing the data until a micro-processing unit 12 can manipulate the data. It is noted that the queue need not be in the memory 14, but may be located in another memory (not shown).

It is preferred that one or more micro-processing units 12 be predisposed as agents to "survey" the queue in memory 14 to determine whether new data has arrived. When new data has arrived in the memory 14, the surveying agents 12 determine what task(s) need to be performed on the data and define the status information for those tasks. The surveying agents 12 then post the status information for the tasks on the bulletin board 14*a*.

It is noted that some of the micro-processing units 12 may perform only one type of task, just as the surveying agents may be programmed to only survey the memory 14. In other words, the application software program running in a particular micro-processing unit 12 may cause the unit to only execute one type of task posted on the bulletin board 14*a*. These micro-processing units 12 are also referred to herein as "specialized agents."

Some micro-processing units 12 are preferably capable of performing more than one type of task and are referred to as "general agents." General agents select a type of task based on the priority of the posted tasks.

Still other micro-processing units 12 may be predisposed to execute a certain type of task but may perform other tasks based on the status of posted tasks on the bulletin board. Indeed, some micro-processing units 12 may be capable of performing one or more types of tasks (other than the predisposed type) when certain conditions are met. For example, when the number of tasks posted on the bulletin board of a certain type is outside a predetermined limit.

It is preferred that if the number of posted tasks of a first type is small relative to the number of posted tasks of a second type, the application software of at least one of the micro-processing units 12 (predisposed to perform tasks of the first type) cause the unit to be temporarily (or permanently) disposed to execute tasks of the second type. Alternatively, if the number of posted tasks of the first type falls below a predetermined threshold, the application software of at least one of the micro-processing units 12 (predetermined to perform tasks of the first type) may cause the unit to be temporarily (or permanently) disposed to execute tasks of a different type.

It is also contemplated that at least one of the micro-processing units 12 (predetermined to perform a certain type of task) enters an idle mode when the number of posted tasks of that type fall below a predetermined number (a threshold). It is desirable that at least some of the micro-processing units 12 have differing thresholds so that all of the micro-processing units 12 which perform the same tasks do not enter the idle mode at the same time. Preferably, the micro-processing unit 12 remain in the idle mode for a predetermined period of time (for example 5 minutes) after which the unit would again be available to perform posted tasks of a certain type.

It is understood that the execution of posted tasks requires processing time (often measured in terms of "CPU" time). Thus, instead of entering an idle mode as described immediately above, the micro-processing unit 12 may enter another mode which makes the CPU time of the micro-processing unit 12 available to perform at least one other logical function not necessarily associated with the posted processing tasks for the electronic data. For example, the micro-processing unit 12 may be made available to execute application software programs (e.g., word processing programs, spreadsheet programs, or the like) that are unrelated to the concurrent task execution of the posted tasks. As before, the micro-processing unit 12 would preferably remain in this mode for a predetermined period of time (or until completion of the application software program) after which the unit would again be available, if needed, to perform posted tasks of a certain type.

From the above examples, it is apparent that the decision by the micro-processing unit 12 to change the type of task it is to execute (or mode in which it is to operate) may be based on any one or more conditions. Preferably, the conditions are derived from the status information on the bulletin board 14a and the conditions may define upper thresholds, lower thresholds or other boundaries which trigger the change by the micro-processor(s) 12.

It is preferred that the micro-processing units 12 be stand alone computers (such as personal computers, mainframe computers, or the like) which are coupled over a standard network (such as an Ethernet, Local Area Network, or the like).

It is apparent to one skilled in the art from the above teaching that the multi-tasking system 1 of the present invention provides inherent redundancy to the manipulation of the electronic data. Indeed, if one or more micro-processing units 12 were to become disconnected from the network or become incapable of performing tasks, the system 1 would not fail to manipulate the electronic data because other micro-processing units 12 would simply execute the posted tasks as designed (although throughput may be affected). In this sense, the system 1 is failure proof.

Figure 4:
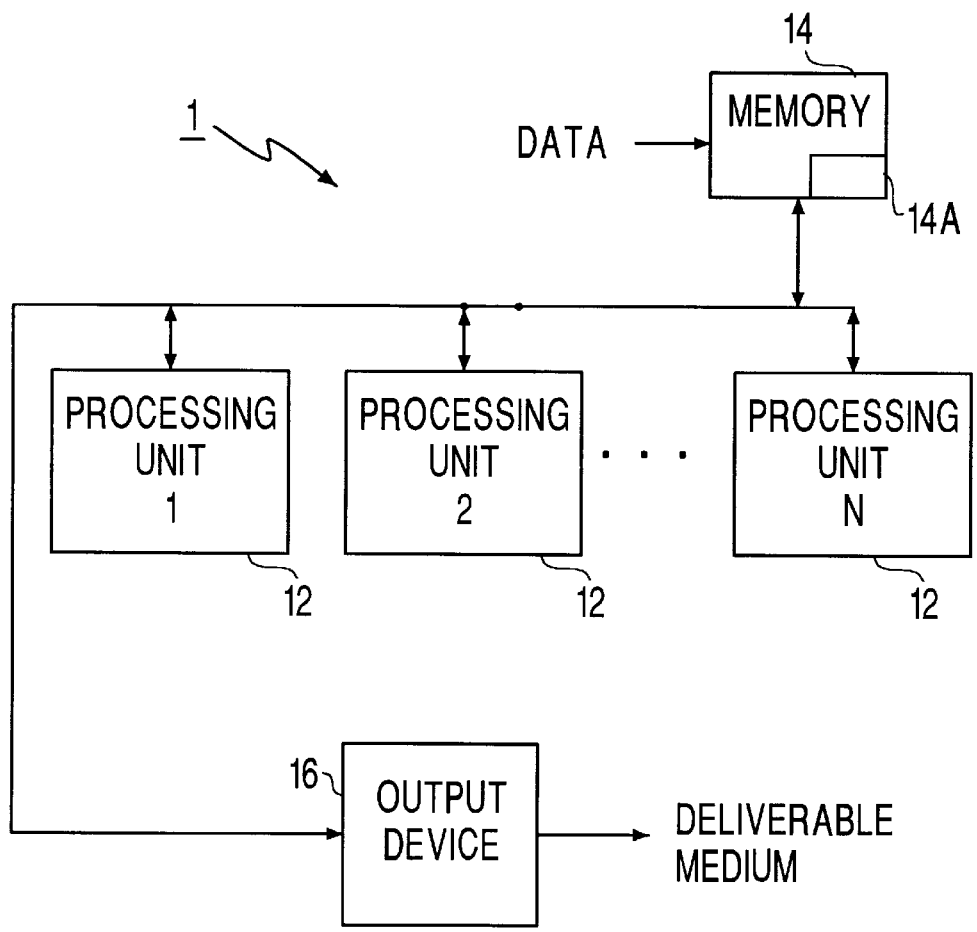
FIG. 4 is a block diagram of a multi-tasking computing system according to an alternate embodiment of the invention of FIG. 2.

Referring to FIG. 4, it is contemplated that the multi-tasking computing system 1 include an output device 16 operatively coupled to the micro-processing units 12. The output device 16 preferably receives the manipulated electronic data and produces a deliverable medium suitable for exploitation by a user. For example, the output device may be a digital microfilm writer, an optical disc writer, a database, a facsimile machine and/or some other electronic data transfer device for transmitting (delivering and/or making available) the manipulated electronic data to the user.

Figure 5:
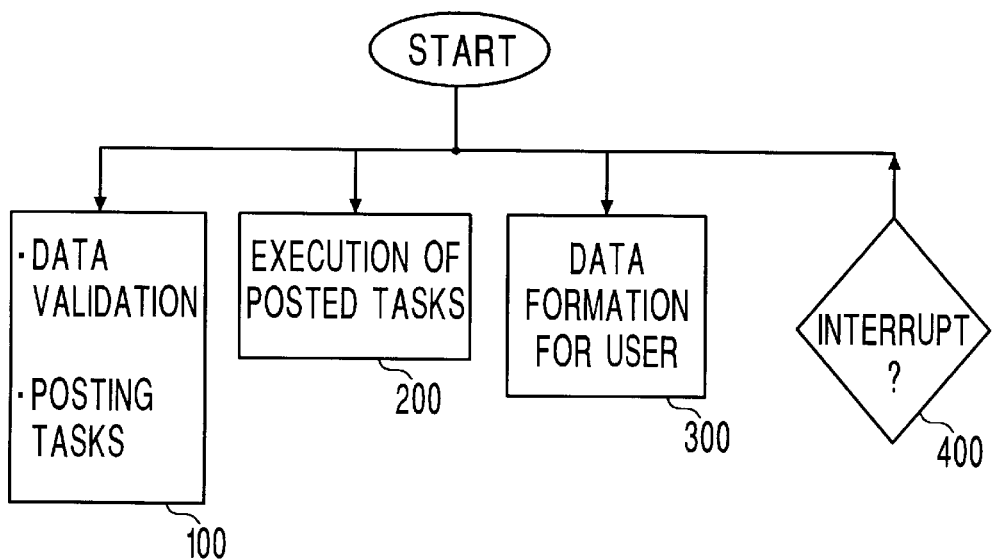
FIG. 5 is a top level flow diagram showing the control steps of the multi-tasking computing system of FIG. 4.

FIG. 5 is a top level block diagram of the processing steps taken by the multi-tasking computing system 1 of FIG. 4. The data validation and posting task sequence 100 is a series of processing steps which are performed by one or more micro-processing units 12 acting as general and/or specialized agents. Sequence 100 validates that the electronic data is in the correct format and is suitable for manipulation by the system 1. Once validated, sequence 100 makes the electronic data available for manipulation by posting the status information for identified tasks onto the bulletin board 14a.

Sequence 200 represents the preferred process steps used to execute the tasks posted on the bulletin board 14a, sequence 300 represents the process used to transform the manipulated data into a specified format for delivery to the user, and sequence 400 represents an interrupt.

Sequences 100–400 are preferably executed by the micro-processing units 12 operating under the control of their own application software programs. The application software programs preferably run on a resident software operating system (e.g., DOS, Windows, OS1 etc.). It is important to note that the micro-processing units 12 are not under the control of a central management computer or program and, therefore, they operate in a substantially autonomous fashion.

Advantageously, the micro-processing units 12 need not be of the same hardware or software configuration because each operates using its own resident operating system. The application software programs which execute, for example, sequences 100–400, are tailored to match the hardware and operating system of a particular micro-processing unit 12. Consequently, the micro-processing units 12 may be coupled together using standard network technology and there is a reduced overhead burden in terms of time, cost and complexity as compared to the prior art.

Turning now to FIG. 6, a more detailed description of sequence 100 will be presented. Some or all of the micro-processing units 12 are preferably capable of executing the data validation and posting tasks 100. If a particular micro-processing unit 12 is a specialized agent, it may only be capable of executing the data validation and posting tasks. If, however, the micro-processing unit 12 is a general agent, it may be capable of executing other tasks, such as one or more electronic data manipulation tasks (FIG. 5, sequence 200) and/or data formation tasks (FIG. 5, sequence 300).

With reference to FIGS. 4 and 6, one or more micro-processing units 12 survey the electronic data queue (preferably located in memory 14) at step 102. If there is no new data in the queue, then the micro-processing unit 12 preferably goes on to another task (if a general agent) or returns to step 102 until new data is present in the queue. At step 104, the electronic data is reviewed for proper format, content, authorization, etc. and accepted at step 106 if appropriate. If the electronic data does not pass the review process at step 104 and 106, correction steps (as are known in the art) may be taken at step 106'.

At step 108, another review process is performed where the type of task(s) to be performed on the electronic data are determined, priority of the task(s) are selected, and any conditional requirements are identified. It is noted that the types of tasks, priority, conditions, etc. may be predetermined and, therefore, a separate review process of the electronic data may not be required. The type, priority and conditions as well as other status information (i.e., "task in progress" and "task completion") is then posted on the bulletin board 14a at step 110. The process then returns to the surveying of the queue (step 102).

Figure 7A:
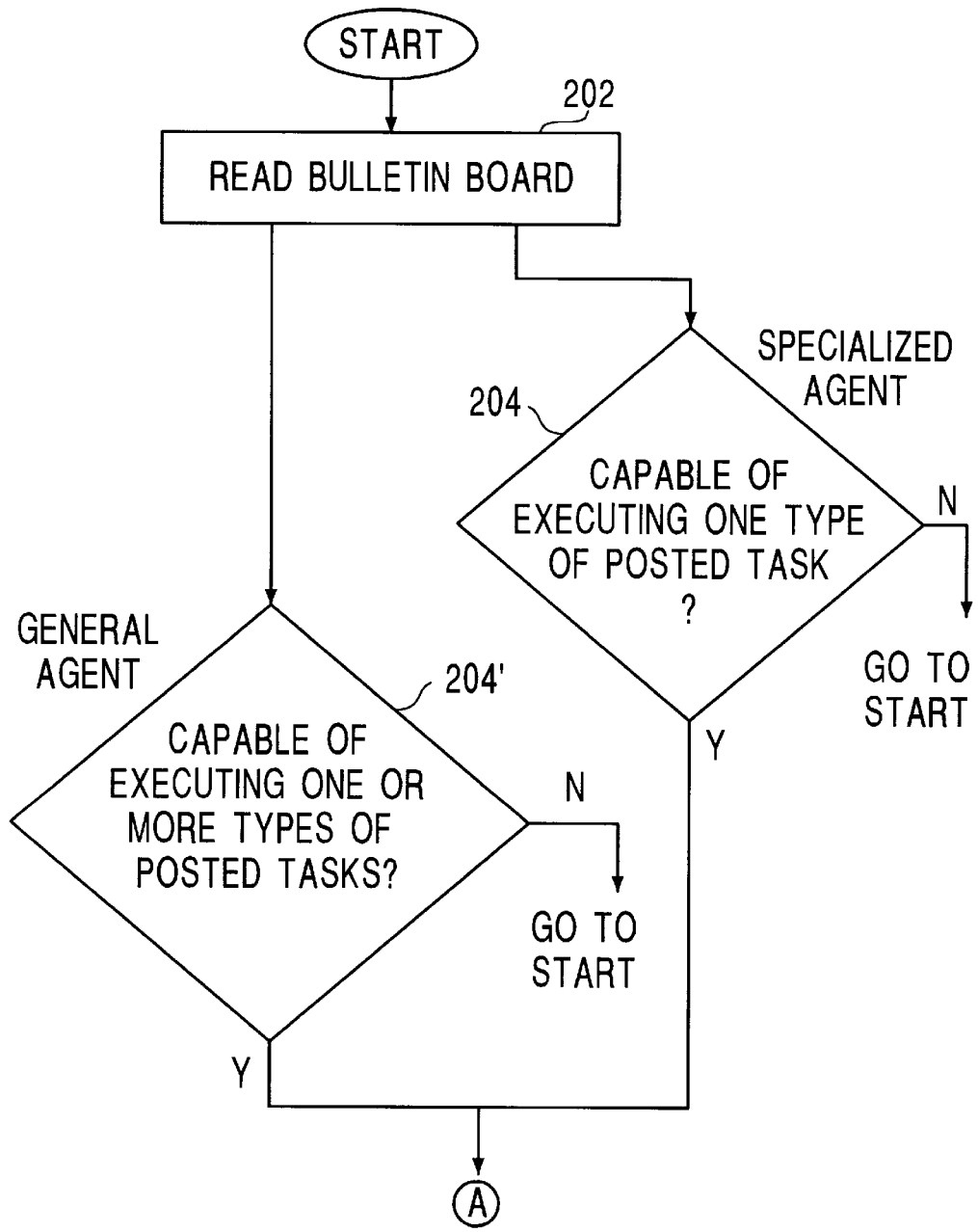
FIGS. 7A–C are flow diagrams showing the control steps of the task execution steps of FIG. 5.

Turning now to FIG. 7A, a more detailed description of sequence 200 will be presented. At step 202 the micro-processing units 12 read the bulletin board 14a for posted tasks and the status information therefor. As described above, the micro-processing units 12 may be of the general agent or specialized agent types. Therefore, at step 204', a general agent 12 determines whether it is capable of executing one or more types of tasks posted on the bulletin board 14a. On the other hand, at step 204 a specialized agent 12 determines whether it is capable of executing a particular type of task posted on the bulletin board 14a. In either case, if at least one type of task may be executed, the micro-processing unit 12 proceeds to point "A" FIG. 7C (discussed later). If the micro-processing unit 12 is not capable of executing a posted task, it returns to step 202.

Figure 7B:
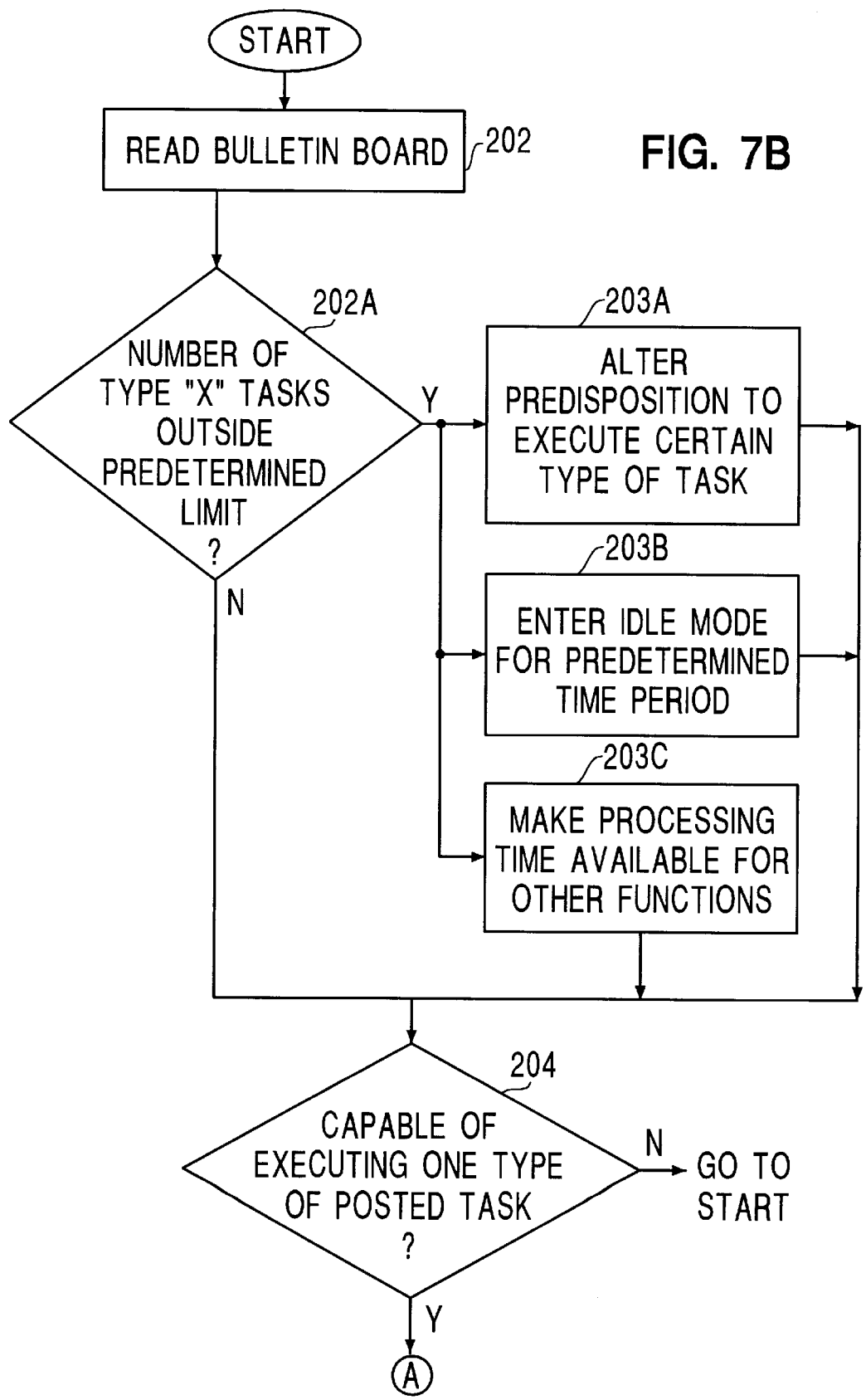

Turning to FIG. 7B, a micro-processing unit 12 may also be predisposed to perform a particular type of task, but may alter its preference to that type of task based on certain conditions. FIG. 7B illustrates one example of the variety of ways in which a micro-processing unit 12 may alter its predisposition to executing a certain type of task.

As was the case above with respect to general and specialized agents, at step 202 the micro-processing units 12 read the bulletin board 14a for posted tasks and the status information therefor. At step 202a, the micro-processing unit 12 determines whether the number of type "X" tasks is outside a predetermined limit. For example, the predetermined lower limit for type X tasks may be set to one (1). Thus, if there are no type X tasks posted on the bulletin board 14a, the step 202a inquiry branches in the affirmative. Alternatively, the predetermined upper limit for type X tasks may be set to (100). Thus, if there are (101) type X tasks posted on the bulletin board 14a, the inquiry at step 202a also branches in the affirmative.

Steps 203a, 203b, and 203c represent alternative examples of actions that a micro-processing unit 12 may take if the number of type X tasks are outside the predetermined limit. Step 203a provides that the micro-processing unit 12 changes its propensity to execute type X tasks for, say, type Y tasks. Step 203b provides that the micro-processing unit 12 enter the idle mode for a predetermined period of time. Step 203c provides that the micro-processing unit 12 be made available for at least one other logical function not necessarily associated with the posted processing tasks for the electronic data.

It is noted that other actions may be taken at step 203 as will be apparent to those skilled in the art and that such other actions are considered within the scope of the instant invention. Since step 203 either presents a delay in time or an alteration of the type of task that a micro-processing unit 12 may perform, the process flow then proceeds to step 204 (an inquiry of whether the micro-processing unit 12 is capable of executing a posted task) which will then likely result in an affirmative branch.

Figure 7C:
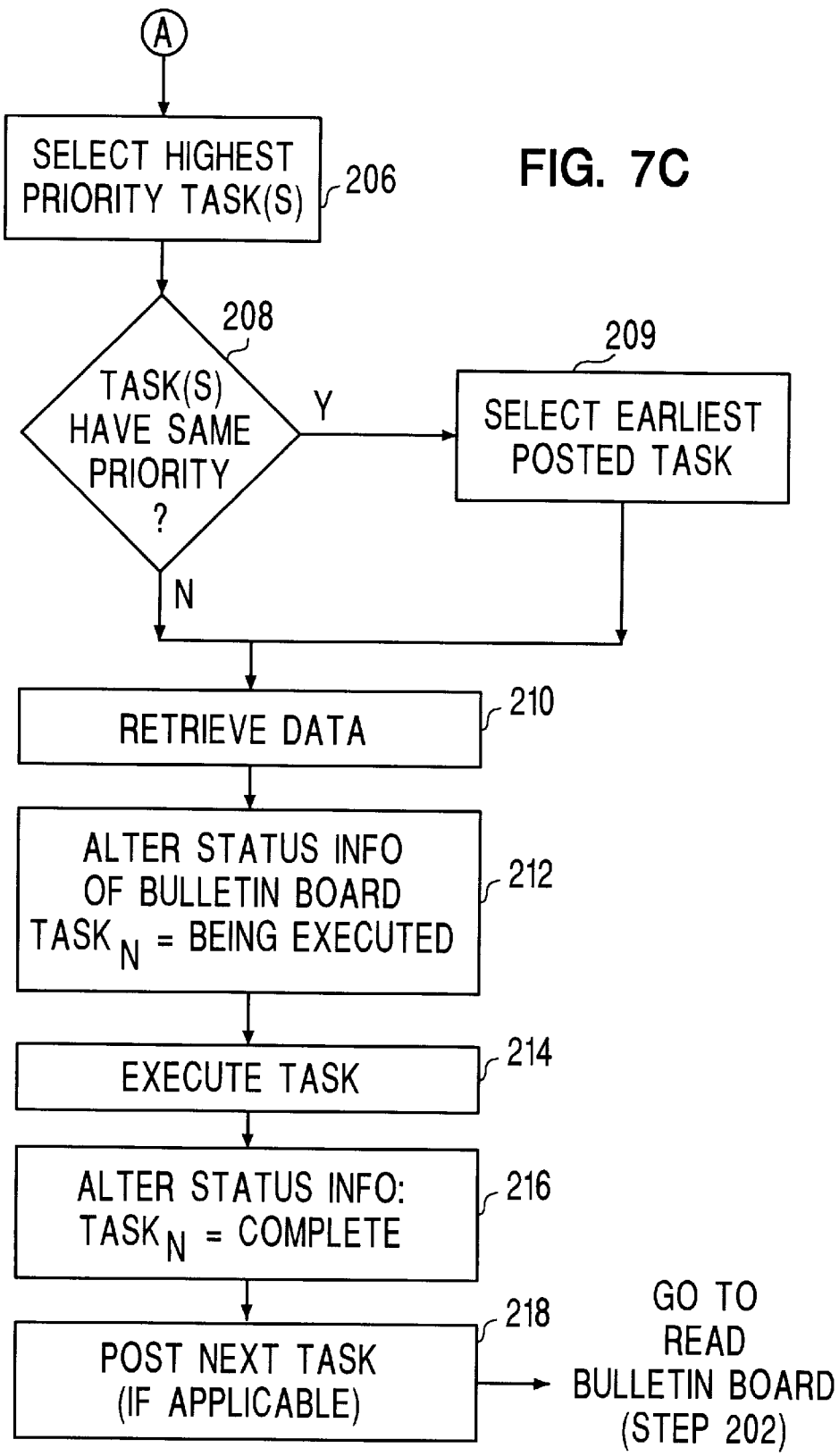

Turning to FIG. 7C, once a micro-processing unit 12 has determined that it is capable of executing at least one posted task, it selects the task(s) which have the highest priority. If more than one task has the same level of priority, then at steps 208 and 209, the task which was posted first is selected following a FIFO sequence. At step 210 the electronic data corresponding to the selected task, for example TASKn, is retrieved (if necessary) from the memory 14. At step 212, the micro-processing unit 12 performing TASKn alters the status information for TASKn posted on the bulletin board 14a to indicated that TASKn is being executed.

Next, at step 214, the micro-processing unit 12 executes TASKn and when completed alters the status information for TASKn to indicate that TASKn is complete (step 216). As discussed above, if applicable, part of TASKn may be defined to include posting a next task (e.g., TASK5) on the bulletin board 14a when TASKn is complete (step 218). The process then returns to step 202 (FIGS. 7A, 7B).

It is noted that some of the posted tasks may be directed toward the sequence 300 process (FIG. 5) which is used to transform the manipulated data into a specified format for delivery to the user. Thus, the sequence 300 process (i.e., data formation for the user) may be an integral part of the sequence 200 process (execution of posted tasks). The sequence 300 process may have a form which is substantially similar to the sequence 200 process flow (FIGS. 7A–7C).

A system interrupt, sequence 400, is available to stop some or all of the micro-processing units 12 from executing tasks. The interrupt may be put into effect in many ways as will be apparent to those skilled in the art. For example, a special task may be posted on the bulletin board 14a which indicates that all (or some) of the micro-processing units 12 should enter the idle mode (or another mode as discussed above). In such a case, sequence 200 would include the step of having the micro-processing units 12 execute the special task before any other tasks. Thus, each of the specified micro-processing units 12 would enter the idle mode after completing the tasks which were already underway at the time of the interrupt.

Figure 8:
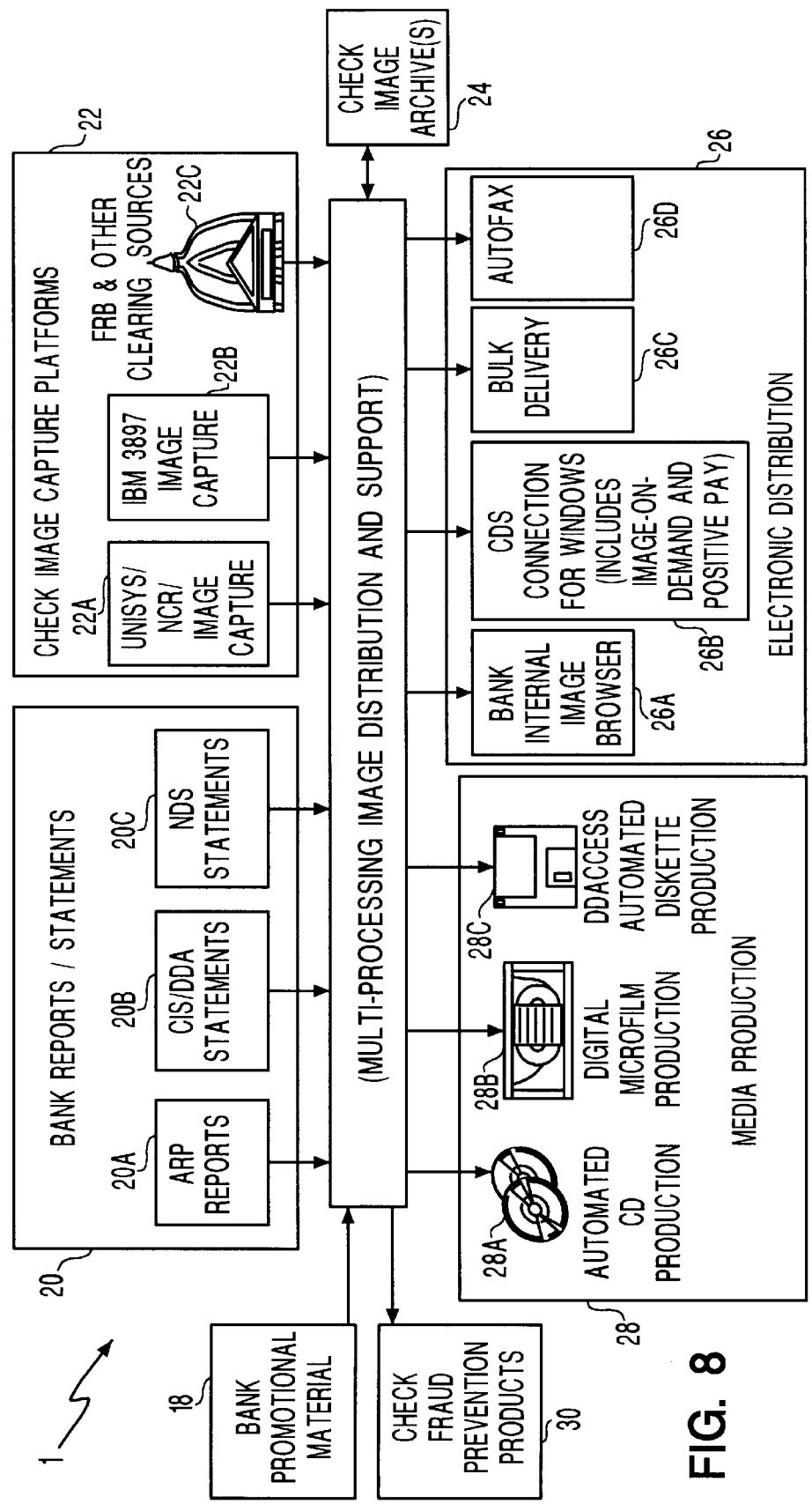
FIG. 8 is a high level conceptual block diagram illustrating an example of a multi-processing image distribution and support system in accordance with the present invention which is suitable for use in the banking industry.
Figure 9:
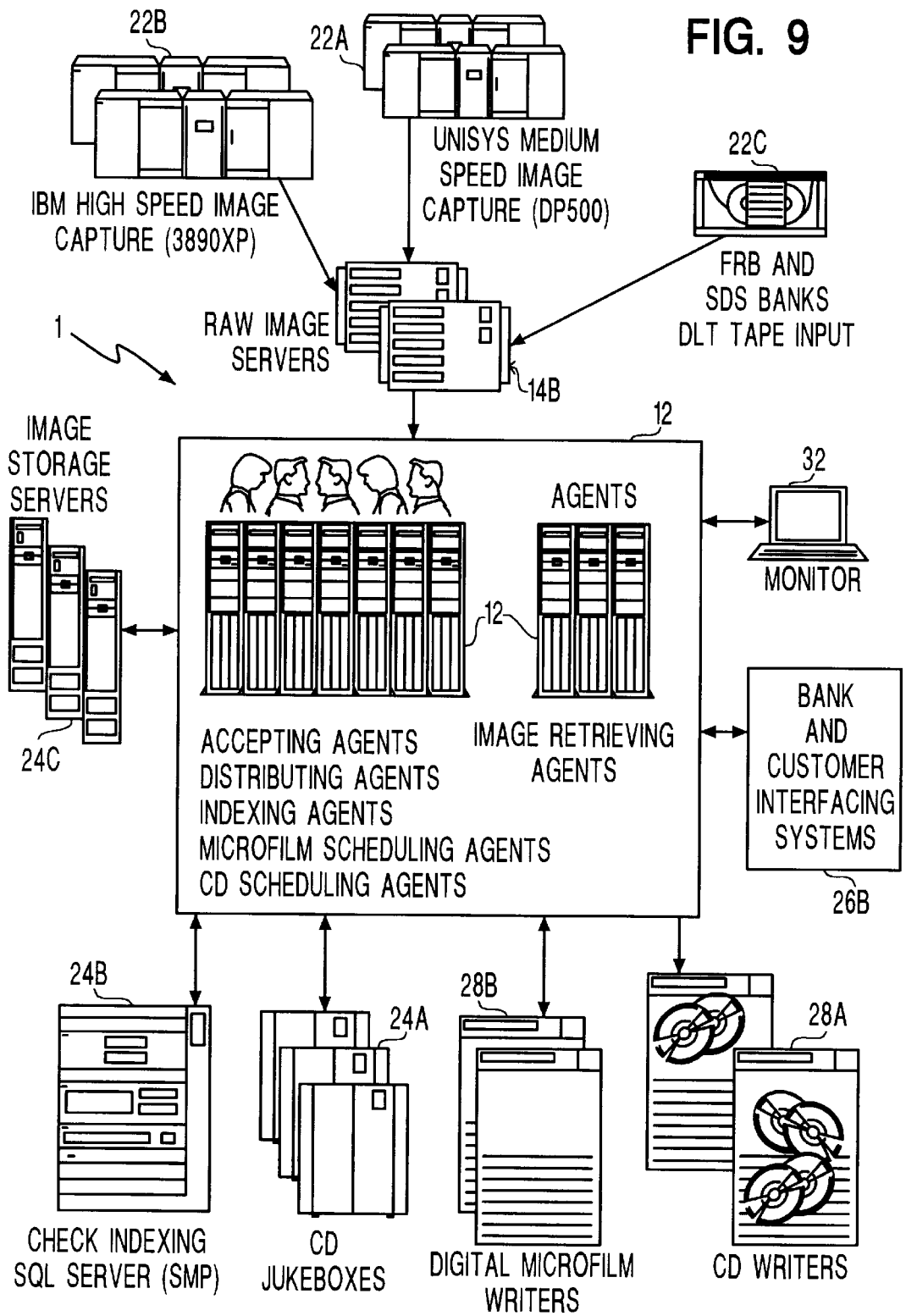
FIG. 9 is a block diagram illustrating the hardware implementation of the multi-processing image distribution and support system of FIG. 8.

With reference to FIG. 8, an illustrative example of a multi-processing image distribution and support system 1 in accordance with the present invention which is suitable for use in the banking industry is presented. FIG. 8 shows a high level conceptual block diagram illustrating the system 1 and FIG. 9 is a block diagram illustrating the hardware implementation of the system 1.

The system 1 provides a check imaging platform which provides a plurality of deliverable and value added products to customers. The system 1 receives a plurality of basic types of input, namely (i) bank promotional material 18; (ii) bank reports and statements 20; and (iii) check image data 22. The outputs of the system 1 include a check image archive 24 (a non-deliverable output), electronic distribution products 26, media production products 28, and fraud prevention products 30.

In general, the system 1 operates to receive the various forms of electronic data (18–22), manipulate the electronic data automatically, and produce deliverable products to customers based on the manipulated electronic data. The system 1 utilizes six (6) basic types of agents 12 in carrying out the tasks required to manipulate the electronic data. The agents include: accepting agents, distributing agents, indexing agents, image retrieving agents, microfilm scheduling agents and CD scheduling agents (FIG. 9).

The invention was reduced to practice in a form in which the micro-processing units 12 (or agents) were implemented using Intel Pentium based work stations running on the Microsoft NT operating system and had at least 32 megabytes of RAM. It is noted, however, that other types of machines may also be used, such as RISC based machines (e.g., DEC Alpha, IBM PowerPC, MIPS processors, etc.). The application software running on the micro-processing units 12 may be a native 32-bit application written in Microsoft Foxpro and/or Microsoft C++.

The system 1 of FIG. 9 is based on the Fast Ethernet (100 MPS) network topology; however, other types of networks may be used, such as a Token Ring, FDDI, or the like.

The operation of the multi-processing image distribution and support system 1 of FIGS. 8 and 9 is now presented in more detail. When the electronic data input to the system 1 is check image data 22, such data may come from a UNISYS and/or NCR image capture platform 22a such as the commercially available DP500. The data may also come from the IBM 3800 series (i.e., 3897, 3890XP, etc.) image capture platform 22b, from the image capture platforms 22c used by the Federal Reserve Bank (FRB) or the Same Day Settlement (SDS) clearing house, or other check clearing sources. The image capture platforms (22a–22c) will provide image data in discrete batches having, for example, several thousand checks per batch.

The image data is received by one or more raw image servers 14b (FIG. 9) which support a plurality of image compression formats (e.g., G4, JPEG, IBM ABIC, etc.). The servers 14b may also perform a storage function (i.e., act as a data queue).

As discussed in detail above, accepting agents 12 capture, validate and process batches of check images in accordance with a plurality of posted tasks on a bulletin board 14a (not shown). The accepting agents 12 (as well as other agents described below) use customer profiles and account profiles to determine what tasks must be posted and formulate the status information for the tasks. Customer profiles and account profiles are stored in, for example, the memory 14 (FIG. 2) and preferably have the forms shown in Table 1 and Table 2 respectively.

TABLE 1

CUSTOMER PROFILE

| | |
|---|---|
| Processing ID: | 4 digit alphanumeric identification |
| Customer Name: | business name |
| Output Medium: | delivered data format (e.g., CD ROM) |
| Volume Threshold: | delivered size (e.g., 25K checks) |
| Production Timing: | deliver data based on time or size |
| Review: | user requested or automatic delivery |
| Image Format: | G4, JPEG, etc. |
| Copies: | number of deliverable copies of data |
| Cycle ID: | internal tracking information |
| Volume ID: | internal tracking information |

TABLE 2

ACCOUNT PROFILE

| | |
|---|---|
| ABA Number: | alphanumeric number found on checks |
| Account Number: | 16 digit number |
| Processing ID: | 4 digit alphanumeric identification |
| Output Type: | check images, (DDA or ARP) statements |
| Other Services: | fraud guard, etc. |

When a batch of data is received in the servers 14b, the accepting agents 12 read the account number from the incoming checks (i.e., from the Magnetic Ink Character Recognition (MICR) line) to obtain the account profile for that customer. Validation of incoming check images is preferably based on the ABA number (valid number?), the account number (valid?, numeric?), the check number (non-zero?, numeric?), and the monetary amount of the check (non-zero?, numeric?). Any image data failing the validation process is rejected and may be repaired if possible.

The account and customer profiles also provide the accepting agents 12 with the information necessary to formulate and post tasks (and status information) on the bulletin board 14a. For example, task priority may be based on the customer account number such that certain customers receive a higher level of priority than others. It is preferred that exception checks (i.e., checks that require a special process, for example, fraudulent checks, etc.) be given the highest level of priority, say (50). Image data to be used to produce CD ROMs are preferably given a lower level of priority, say (20). A lowest level of priority, say (10) is preferably given to so-called Off-Us check data (i.e., checks that are drawn on a different bank).

The accepting agents 12 disassemble the batches of image data into image files for each check which is stored in a TIFF envelope in the compression format received. The accepting agents 12 then create an index file containing the information contained in the image files for the checks of the batch. The batch is then passed to the distributing agents 12.

Distributing agents 12 also utilize the customer and account profiles in routing the image data to the proper locations (or stages) in the system 1. For example, when the account profile and/or customer profile indicates that a CD ROM is to be produced, the check image data are delivered to a CD Scheduling Agent 12. Some of the distributing agents 12 update certain indexes in the system 1, for example, Control Disbursements Services (CDS) Indexes, Archive Indexes, CD ROM Indexes, etc. It is preferred that the Archive Index always be updated when the check image is an exception check.

The CD scheduling agents 12 and microfilm scheduling agents 12 operate in a substantially similar way. In particular, they monitor the bulletin board 14a waiting for a batch of customer check images meeting the volume threshold (e.g., 15,000 checks) and production timing requirements specified in the customer profile (Table 1). Once a customer's requirements are met, the CD or microfilm scheduling agent 12 will schedule appropriate media production hardware 28 (FIG. 9) to produce the required deliverable product. For example, the scheduling agent 12 may access a CD writer 28a (preferably a Kodak 6X), a digital microfilm writer 28b, or a DDA diskette writer 28c.

As discussed above, input data to the multi-processing image distribution and support system 1 may also be in the form of bank promotional material 18 and/or bank reports and statements 20 (FIG. 8). Specifically, the input data may be in the form of Account Reconciling Processing (ARP) reports 20a, Demand Deposit Accounting (DDA) statements 20b, and/or National Deposit System (NDS) statements 20c. From the above teaching, it will be apparent to one skilled in the art that the tasks of the multi-processing image distribution and support system 1 may be formulated such that the media production hardware 28 produces check images, DDA statements, ARP statements, and/or product marketing material as desired.

The multi-processing image distribution and support system 1 may also make deliverable products available for customers by way of electronic distribution hardware 26 (FIG. 8). Fraud prevention products 30 may also be made available to customers via electronic distribution. As will be apparent to those skilled in the art from the above teaching, manipulated data such as check image data or the like may be formatted for: (i) use in an internal image browser 26a; (ii) CDS connections 26b; (iii) bulk delivery via a transmission device 26c; and/or (iv) delivery via automatic facsimile hardware 26d.

It is preferred that all data files be stored in the archive 24 which may be implemented using CD jukeboxes 24a, a check indexing SQL server 24b, and/or image storage servers 24c (FIG. 9).

A monitor 32 may be used to provide comprehensive system information such as agent status, batch status, error status, event status, and/or process bottlenecks. The monitor 32 also permits performance measurements of the system 1 to be taken, and provides system control (for example interrupts 400).

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An apparatus for manipulating electronic data according to one or more tasks, the apparatus comprising:
   a plurality of micro-processing units each operating under its own control program and being capable of performing at least one of the tasks; and
   an electronic bulletin board for posting the one or more tasks required to manipulate the electronic data, the posted tasks being readable by the micro-processing units, at least one of the micro-processing units, capable of performing at least one of the posted tasks, executing that task on the electronic data in response to reading the electronic bulletin board and determining that the posted task should be executed.

2. The apparatus of claim 1, wherein the electronic bulletin board includes status information for each of the tasks, the status information of each task including at least one of:
 (i) the type of task to be executed;
 (ii) the priority of the task;
 (iii) that the task is being executed by one of the micro-processing units;
 (iv) that the task is complete; and
 (v) one or more conditions must be met before the task should be executed.

3. The apparatus of claim 2, wherein the micro-processing units are capable of reading and altering the status information of the electronic bulletin board.

4. The apparatus of claim 2, further comprising an input data queue for receiving and storing the electronic data, one or more of the micro-processing units being capable of surveying the electronic data in the queue and altering the bulletin board to post the status information on the one or more tasks that are required to manipulate the electronic data.

5. The apparatus of claim 1, further comprising an input data queue for receiving and storing the electronic data, one or more of the micro-processing units being capable of surveying the electronic data in the queue and altering the bulletin board to post the one or more tasks that are required to manipulate the electronic data.

6. The apparatus of claim 2, wherein tasks having a higher priority are executed by micro-processing units capable of performing those tasks before other tasks having a lower priority.

7. The apparatus of claim 2, wherein a micro-processing unit capable of performing a posted task alters the status information of the bulletin board to post that the task is being executed.

8. The apparatus of claim 2, wherein a micro-processing unit having performed a posted task is capable of altering the status information of the bulletin board to post that the task is complete.

9. The apparatus of claim 2, wherein a micro-processing unit having performed a posted task is capable of altering the status information of the bulletin board to post that a next task must be performed on the electronic data.

10. The apparatus of claim 1, wherein one or more micro-processing units include a program to be predispose them to perform a first type of task.

11. The apparatus of claim 10, wherein the one or more micro-processing units are capable of performing one or more other types of tasks when the number of tasks posted on the bulletin board of a certain type is outside a predetermined limit.

12. The apparatus of claim 11, wherein the one or more micro-processing units are capable of performing a second type of task when the number of first type tasks posted on the bulletin board is outside a predetermined limit.

13. The apparatus of claim 11, wherein the one or more micro-processing units are capable of performing a second type of task when the number of first type tasks posted on the bulletin board is below a predetermined threshold.

14. The apparatus of claim 10, wherein the one or more micro-processing units are capable of entering an idle mode when the number of first type tasks is below a predetermined threshold.

15. The apparatus of claim 14, wherein the one or more micro-processing units are capable of entering the idle mode for a predetermined period of time after which the one or more micro-processing units are again available to perform first type tasks.

16. The apparatus of claim 10, wherein the one or more micro-processing units are available to perform at least one logical function other than the tasks posted on the bulletin board when the number of first type tasks are below a predetermined threshold.

17. The apparatus of claim 16, wherein the other logical function includes a personal computer application software program.

18. The apparatus of claim 1, wherein the micro-processing units are stand alone computers coupled to a network.

19. The apparatus of claim 18, wherein the stand alone computers are personal computers.

20. The apparatus of claim 18, wherein the stand alone computers are mainframe computers.

21. The apparatus of claim 18, wherein the network is an Ethernet.

22. The apparatus of claim 18, wherein the network is a Local Area Network.

23. An apparatus for manipulating electronic data according to one or more tasks, the apparatus comprising:
 a plurality of micro-processing units each operating under its own control program and being capable of performing at least one of the tasks;
 an electronic bulletin board for posting the one or more tasks required to manipulate the electronic data, the posted tasks being readable by the micro-processing units;
 at least one of the micro-processing units, capable of performing at least one of the posted tasks, executing that task on the electronic data in response to reading the electronic bulletin board and determining that the posted task should be executed;
 an input data queue for receiving and storing the electronic data, one or more of the micro-processing units being capable of surveying the electronic data in the queue and altering the bulletin board to post the one or more tasks that are required to manipulate the electronic data; and
 an output device for receiving the manipulated electronic data and transforming the electronic data into a predetermined data format for delivery to a user.

24. The apparatus of claim 23, wherein the output device is a digital microfilm writer for producing microfilm containing the manipulated electronic data.

25. The apparatus of claim 23, wherein the output device is an optical disk writer for producing an optical disk containing the manipulated electronic data.

26. The apparatus of claim 23, wherein the output device is a database containing the manipulated electronic data, the database being user accessible.

27. The apparatus of claim 23, wherein the output device is a facsimile machine for transmitting the manipulated electronic data to the user.

28. The apparatus of claim 23, wherein the output device is an electronic data transfer device for transmitting the manipulated electronic data to an electronic receiving device of the user.

29. A method for manipulating electronic data according to one or more tasks, the method using a plurality of networked micro-processing units each operating under its own control program and being capable of performing at least one of the posted tasks, the method comprising the steps of:

receiving the electronic data into a input data queue;

surveying the electronic data and determining the one or more tasks required to manipulate the electronic data;

posting the one or more tasks required to manipulate the electronic data on an electronic bulletin board;

one of the micro-processing units reading the posted tasks of the bulletin board and determining that it is capable of performing a posted task;

the one micro-processing unit executing the task on the electronic data.

30. The method of claim 29, wherein the surveying step includes at least one of the steps of:

(i) determining the type of task to be executed;

(ii) determining the priority of the task; and (iii) determining whether one or more conditions must be met before the task should be executed.

31. The method of claim 30, wherein the posting step includes at least one of the steps of:

(i) posting the type of task to be executed;

(ii) posting the priority of the task;

(iii) posting whether the task is being executed by one of the micro-processing units;

(iv) posting whether the task is complete; and (v) posting whether one or more conditions must be met before the task should be executed.

32. The method of claim 30, wherein the micro-processing units execute tasks having a higher priority before other tasks having a lower priority.

33. The method of claim 30, wherein a micro-processing unit capable of performing a posted task posts that the task is being executed on the bulletin board.

34. The method of claim 31, wherein a micro-processing unit having performed a posted task posts that the task is complete on the bulletin board.

35. The method of claim 30, wherein a micro-processing unit having performed a posted task posts that a next task must be performed on the electronic data.

36. The method of claim 29, wherein one or more micro-processing units are programmed to be predisposed to perform a first type of task.

37. The method of claim 36, wherein the one or more micro-processing units perform one or more other types of tasks when the number of tasks posted on the bulletin board of a certain type is outside a predetermined limit.

38. The method of claim 37, wherein the one or more micro-processing units perform a second type of task when the number of first type tasks posted on the bulletin board is outside a predetermined limit.

39. The method of claim 37, wherein the one or more micro-processing units perform a second type of task when the number of first type tasks posted on the bulletin board is below a predetermined threshold.

40. The method of claim 36, wherein the one or more micro-processing units enter an idle mode when the number of first type tasks is below a predetermined threshold.

41. The method of claim 40, wherein the one or more micro-processing units enter the idle mode for a predetermined period of time after which the one or more micro-processing units are again available to perform first type tasks.

42. The method of claim 36, wherein the one or more micro-processing units perform at least one logical function other than the tasks posted on the bulletin board when the number of first type tasks is below a predetermined threshold.

43. The method of claim 42, wherein the other logical function includes a personal computer application software program.

44. The method of claim 29, further comprising the step of transforming the electronic data into a predetermined data format for delivery to a user.

45. The method of claim 44, wherein the step of transforming the electronic data includes producing microfilm containing the manipulated electronic data.

46. The method of claim 44, wherein the step of transforming the electronic data includes producing an optical disk containing the manipulated electronic data.

47. The method of claim 44, wherein the step of transforming the electronic data includes storing the manipulated electronic data in a database, the database being user accessible.

48. The method of claim 44, wherein the step of transforming the electronic includes producing an electronic file containing the manipulated electronic data and transmitting file to the user via a facsimile machine.

49. The method of claim 44, wherein the step of transforming the electronic data includes producing an electronic file containing the manipulated electronic data and transmitting the file to an electronic receiving device of the user.

* * * * *